(12) United States Patent
Verdun et al.

(10) Patent No.: US 7,102,140 B2
(45) Date of Patent: Sep. 5, 2006

(54) RADIATION SOURCE ASSEMBLY AND RADIATION SOURCE MODULE CONTAINING SAME

(75) Inventors: Alex Verdun, London (CA); Jennifer Gerardi, London (CA)

(73) Assignee: Trojan Technologies Inc., (CA)

( * ) Notice: Subject to any disclaimer, the term of this patent is extended or adjusted under 35 U.S.C. 154(b) by 145 days.

(21) Appl. No.: 10/845,588

(22) Filed: May 14, 2004

(65) Prior Publication Data

US 2005/0011838 A1    Jan. 20, 2005

Related U.S. Application Data

(60) Provisional application No. 60/470,185, filed on May 14, 2003.

(51) Int. Cl.
| | |
|---|---|
| G01N 21/01 | (2006.01) |
| G01N 21/51 | (2006.01) |
| G01N 23/10 | (2006.01) |
| G01N 23/12 | (2006.01) |
| H01J 37/20 | (2006.01) |

(52) U.S. Cl. .............................. 250/432 R; 250/455.11
(58) Field of Classification Search ............ 250/432 R, 250/455.11, 436; 422/24
See application file for complete search history.

(56) References Cited

U.S. PATENT DOCUMENTS

| 4,602,162 A | 7/1986 | Sperry, III et al. |
| 6,512,234 B1 * | 1/2003 | Sasges et al. ............... 250/373 |
| 6,830,697 B1 * | 12/2004 | Pearcey ...................... 210/748 |
| 2002/0162970 A1 | 11/2002 | Sasges |

FOREIGN PATENT DOCUMENTS

| DE | 297 07 052 U1 | 11/1997 |
| DE | 198 03 071 A 1 | 7/1999 |
| DE | 101 29 491 A1 | 1/2003 |
| WO | WO 01/17907 A1 | 3/2001 |
| WO | WO 01/44766 A2 | 6/2001 |
| WO | WO 01/44766 A3 | 6/2001 |

* cited by examiner

*Primary Examiner*—John R. Lee
*Assistant Examiner*—Jennifer Yantorno
(74) *Attorney, Agent, or Firm*—Katten Muchin Rosenman LLP

(57) ABSTRACT

The invention relates to radiation source assembly including a novel arrangement for protecting at least a portion of an optical radiation sensor from damage due to thermal build-up from the radiation being sensed while allowing the optical radiation sensor to function in a substantially normal manner. Generally, in the present arrangement, damaging radiation from the radiation field in which the sensor is disposed is substantially prevented from contacting the sensor. This may be achieved in a number of different ways.

82 Claims, 3 Drawing Sheets

RADIATION SOURCE ASSEMBLY AND RADIATION SOURCE MODULE CONTAINING SAME

CROSS-REFERENCE TO RELATED APPLICATION

The present application claims the benefit under 35 U.S.C. §119(e) of provisional patent application Ser. No. 60/470,185, filed May 14, 2003, the contents of which are hereby incorporated by reference.

BACKGROUND OF THE INVENTION

1. Field of the Invention

In one of its aspects, the present invention relates to a radiation source assembly. In another of its aspects, the present invention relates to a radiation source module comprising a novel radiation source assembly having incorporated therein an optical radiation sensor.

2. Description of the Prior Art

Optical radiation sensors are known and find widespread use in a number of applications. One of the principal applications of optical radiation sensors is in the field of ultraviolet radiation fluid disinfection systems.

It is known that the irradiation of water with ultraviolet light will disinfect the water by inactivation of microorganisms in the water, provided the irradiance and exposure duration are above a minimum "dose" level (often measured in units of micro Watt seconds per square centimetre). Ultraviolet water disinfection units such as those commercially available from Trojan Technologies Inc. under the tradenames Trojan UV Max™, Trojan UV Logic™ and Trojan UV Swift™, employ this principle to disinfect water for human consumption. Generally, water to be disinfected passes through a pressurized stainless steel cylinder which is flooded with ultraviolet radiation. Large scale municipal waste water treatment equipment such as that commercially available from Trojan Technologies Inc. under the tradenames UV3000™, UV3000 Plus™ and UV4000™, employ the same principal to disinfect waste water. Generally, the practical applications of these treatment systems relates to submersion of treatment module or system in an open channel wherein the wastewater is exposed to radiation as it flows past the lamps. For further discussion of fluid disinfection systems employing ultraviolet radiation, see any one of the following:

U.S. Pat. No. 4,482,809,
U.S. Pat. No. 4,872,980,
U.S. Pat. No. 5,006,244,
U.S. Pat. No. 5,418,370,
U.S. Pat. No. 5,539,210, and
U.S. Pat. Re36,896.

In many applications, it is desirable to monitor the level of ultraviolet radiation present within the water under treatment. In this way, it is possible to assess, on a continuous or semi-continuous basis, the level of ultraviolet radiation, and thus the overall effectiveness and efficiency of the disinfection process.

It is known in the art to monitor the ultraviolet radiation level by deploying one or more passive sensor devices near the operating lamps in specific locations and orientations which are remote from the operating lamps. These passive sensor devices may be photodiodes, photoresistors or other devices that respond to the impingent of the particular radiation wavelength or range of radiation wavelengths of interest by producing a repeatable signal level (in volts or amperes) on output leads.

Conventional ultraviolet disinfection systems often incorporate arrays of lamps immersed in a fluid to be treated. Such an arrangement poses difficulties for mounting sensors to monitor lamp output. The surrounding structure is usually a pressurized vessel or other construction not well suited for insertion of instrumentation. Simply attaching an ultraviolet radiation sensor to the lamp module can impede flow of fluid and act as attachment point for fouling and/or blockage of the ultraviolet radiation use to treat the water. Additionally, for many practical applications, it is necessary to incorporate a special cleaning system for removal of fouling materials from the sensor to avoid conveyance of misleading information about lamp performance.

International Publication Number WO 01/17906 [Pearcey] teaches a radiation source module wherein at least one radiation source and an optical radiation sensor are disposed within a protective sleeve of the module. This arrangement facilitates cleaning of the sensor since it is conventional to use cleaning systems for the purposes of removing fouling materials from the protective sleeve to allow for optimum dosing of radiation—i.e., a separate cleaning system for the sensor is not required. Further, since the optical radiation sensor is disposed within an existing element (the protective sleeve) of the radiation source module, incorporation of the sensor in the module does not result in any additional hydraulic head loss and/or does not create a "catch" for fouling materials.

While Pearcey represents an advance in the art, there is still room for improvement.

Specifically, in the Pearcey arrangement, radiation from sources adjacent to the protective sleeve containing the sensor can result in a thermal build-up in the sensor resulting in damage. Accordingly, it would be desirable to have an arrangement whereby, on the one hand, portions of the sensor could be protected from damage due to such thermal build-up while, on the other hand, function of the sensor in detecting the level of optical radiation could be maintained.

SUMMARY OF THE INVENTION

It is an object of the present invention to obviate or mitigate at least one of the above-mentioned disadvantages of the prior art.

It is an object of the present invention to provide a novel radiation source module which obviates or mitigates at least one of the above-mentioned disadvantages of the prior art.

It is another object of the present invention to provide a novel radiation source assembly which obviates or mitigates at least one of the above-mentioned disadvantages of the prior art.

Accordingly, in one of its aspects, the present invention provides a radiation source module for use of fluid treatment system, the module comprising:

a frame having a first support member;

at least one radiation source assembly extending from and in engagement (preferably sealing engagement) with a first support member, the at least one radiation source assembly comprising at least one radiation source disposed within a protective sleeve, the protective sleeve comprising a radiation transparent first region and a radiation opaque second region; and an optical radiation sensor disposed within the protective sleeve, the sensor comprising a radiation detector in substantial alignment with the first region and a body portion in substantial alignment with the second region.

In another of its aspects, the present invention provides a radiation source assembly for use in a radiation source module, the radiation source assembly comprising a protective sleeve, the protective sleeve comprising a radiation transparent first region and a radiation opaque second region, at least one radiation source disposed in the protective sleeve and an optical radiation sensor disposed in the protective sleeve, the sensor comprising a radiation detector in substantial alignment with the first region and a body portion in substantial alignment with the second region.

In yet another of its aspects, the present invention provides a fluid treatment system comprising:

a fluid treatment zone;

at least one radiation source assembly disposed in the fluid treatment zone, the at least one radiation source assembly comprising at least one radiation source disposed within a protective sleeve, the protective sleeve comprising a radiation transparent first region and a radiation opaque second region; and an optical radiation sensor disposed within the protective sleeve, the sensor comprising a radiation detector in substantial alignment with the first region and a body portion in substantial alignment with the second region.

In yet another of its aspects, the present invention provides a radiation sensor assembly comprising a protective sleeve, the protective sleeve comprising a radiation transparent first region and a radiation opaque second region, an optical radiation sensor disposed in the protective sleeve, the sensor comprising a radiation detector in substantial alignment with the first region and a body portion in substantial alignment with the second region.

In a preferred embodiment of the fluid treatment system, the fluid treatment zone comprises a housing through which fluid flows. Preferably, the at least one radiation source assembly is secured to the housing.

Thus, the present inventors have discovered a novel arrangement for protecting at least a portion of an optical radiation sensor from damage due to thermal build-up from the radiation being sensed while allowing the optical radiation sensor to function in a substantially normal manner. Generally, in the present arrangement, damaging radiation from the radiation field in which the sensor is disposed is substantially prevented from contacting the sensor. This may be achieved in a number of different ways.

In a first preferred embodiment of the present invention, the optical radiation sensor comprises a radiation detector and a body portion. The radiation detector contains a photodiode or other sensing element which is able to detect and respond to incident radiation. The body portion houses one or more of electronic components, mirrors, optical components and the like. The optical radiation sensor is disposed within a protective sleeve. The protective sleeve may comprise first radiation transparent region in substantial alignment with the radiation detector (or sensing element) and a radiation opaque second region which is in substantial alignment with the body portion of the sensor. Those of skill in the art will also appreciate that the sensing element may be protect by its own integral protective (e.g., quartz) sleeve which may be positioned inside a lamp sleeve, the latter being coated to provide thermal protection.

Throughout this specification, reference is made to a "radiation transparent" region and a "radiation opaque" region. Of course, those of skill in the art will recognize that these terms will depend on the nature of radiation present in the radiation field. For example, if the present invention is employed in an ultraviolet (UV) radiation field, it is principally radiation in this portion of the electromagnetic spectrum to which the "radiation opaque" region should be opaque—i.e., the radiation opaque region may be transparent to radiation having characteristics (e.g., wavelength) different than radiation to be blocked. By "radiation opaque" is meant that no more than 5%, preferably no more than 4%, preferably no more than 3%, of the radiation of interest (e.g., this could be radiation at all wavelengths or at selected wavelengths) from the radiation field will pass through the region and impinge on the radiation sensing element. Thus, in some embodiments of the invention, all radiation (e.g., one or more of UV, visible and infrared radiation) present in the radiation field will be blocked to achieve thermal protection of the sensor in addition to eliminating impingement of incident radiation. In other embodiments of the invention, a pre-determined portion of radiation (e.g., one or two of UV, visible and infrared radiation) present in the radiation field will be blocked to achieve thermal protection of the sensor while allowing impingement of a pre-determined portion of incident radiation.

Depending on the radiation field in question, the radiation opaque region may be provided on the protective sleeve in a number of different ways. For example, it is possible to utilize a metallic layer disposed on the interior or exterior of the protective sleeve to confer radiation opacity to the protective sleeve. The metallic layer may compromise at least one member selected from the group comprising stainless steel, titanium, aluminum, gold, silver, platinum, nitinol and mixtures thereof. Alternatively, a ceramic layer may be disposed on the interior or the exterior of the protective sleeve to confer radiation opacity to the protective sleeve. In yet another embodiment, the radiation opaque layer may comprise of porous metal structure and combination with a metal material. The porous metal structure may contain a metal selected from the group of metallic layers referred to above. Examples of non-metal materials in this embodiment of the radiation opaque layer include an elastomer secured to the porous metal structure.

In another embodiment, radiation specific opacity may be conferred to the protective sleeve by placement in the interior or the exterior thereof a filter layer which will exclude deleterious radiation but allow radiation of interest to pass through the protective sleeve to be detected by the sensor. Thus, again using the example of an ultraviolet radiation sensor, in many cases, the wavelength of interest for detection is in the range of from about 210 to about 300 nm. It is possible to utilize a layer made from a filter material which will allow substantially only radiation in this range through the protective sleeve allowing detection of radiation while minimizing or preventing thermal build-up compared to the situation where all radiation from the radiation field is allowed to enter the protective sleeve. Non-limiting examples of suitable such filter materials may be made from heavy metal oxides of varying thickness and/or numbers of layers depending on the type of radiation being sensed. Those of skill in the art will further appreciate that the optical radiation sensor may have a thermal opaque region as well as a filtered region to protect the sensing element (e.g., photodiode) of the optical radiation sensor.

In one embodiment, the present invention relates to a radiation source module comprising of frame having a first support member, at least one radiation source assembly extending from and in engagement with the first support member. The radiation source assembly comprises at least one radiation source disposed within a protective sleeve. The protective sleeve comprises a radiation transparent first region and a radiation opaque second region. An optical sensor is disposed within the protective sleeve. The sensor comprises a radiation detector (e.g., a photodiode or the like) in substantial alignment with the first region and a body portion in substantial alignment with the second region. The frame may contain a second support member opposed to and laterally spaced from the first support member. The frame may further comprise a third support member which interconnects the first support member and the second support member. Further, the frame may comprise a ballast disposed at any point thereon for controlling at least one radiation source in the module.

The provision of the radiation transparent region may take a number of forms. This can be achieved by physically placing a metal layer or depositing a metal layer on the interior or exterior of the protective sleeve such that the radiation transparent region has a desired shape. For example, the radiation transparent region may have an annular shape, a non-annular shape, a rectilinear shape, a curvilinear shape, a substantially circular shape and the like. Further, the radiation opaque region may be designed to provide a plurality (i.e., two or more) of radiation transparent regions.

The manner of disposing the radiation opaque region on the protective sleeve is not particularly restricted. For example, the radiation opaque layer may be adhered, mechanically secured or friction fit to the protective sleeve. The latter two approaches work particularly well when the radiation opaque layer is disposed on the exterior of the protective sleeve. For the interior of the protective quartz sleeve, it is possible to insert a split expanding sleeve. The first approach is preferred in the case where the radiation opaque layer is disposed on the interior or exterior of the protective sleeve. This approach may be used to deposit a fully or selective radiation opaque layer, for example, via vapor deposition, electron beam gun deposition or the like of a metal oxide (e.g., silicon dioxide, titanium dioxide, etc.).

Another aspect of the present invention relates to the provision of a radiation source assembly as described above—i.e., not necessarily incorporating the other frame components of the module described above. Still further, another aspect of the present invention relates to a radiation sensor assembly comprising a protective sleeve and an optical radiation sensor disposed in the protective sleeve. The features of the protective sleeve and the optical radiation sensor would be the same as those described above however, in this embodiment, there is no requirement that a radiation source be part of the assembly.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
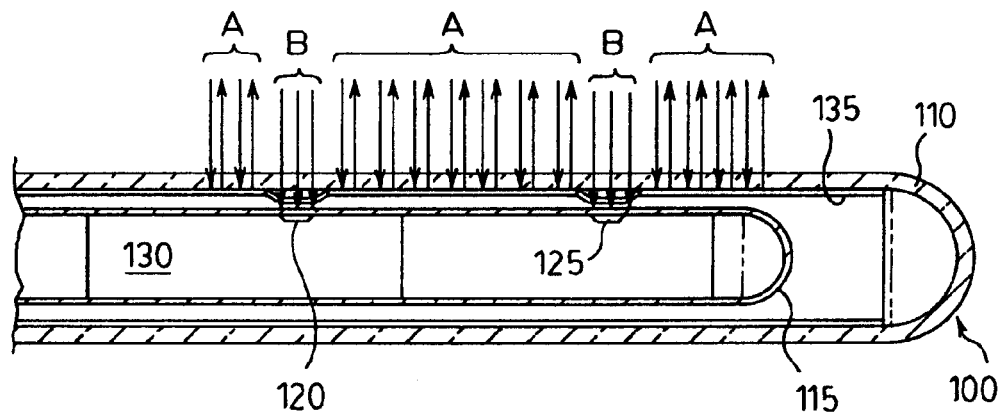
FIG. 1 illustrates a sectional view of a portion of a first embodiment of the present radiation source assembly.

With reference to FIG. 1, there is illustrated a portion of a radiation sensor assembly 100 comprises a protective sleeve 110. Disposed within protective sleeve 110 is an optical radiation sensor 115. Optical radiation sensor 115 comprises a pair of sensing elements 120,125 and a body portion 130 disposed on an interior surface of protective sleeve 110 is a radiation opaque layer 135. The nature of radiation opaque layer 135 is as described above. Radiation opaque layer 135 comprises a pair of apertures in substantial alignment with sensing elements 120,125.

The remainder of assembly 100 is not shown for clarity. Those of skill in the art will recognize that this may include extension of protective sleeve 110 to include a radiation source and/or mechanical connection means to a fluid treatment system or the like.

In use, assembly 100 is disposed in a radiation field of interest. Radiation which impacts protective sleeve in regions A is reflected and/or does not pass through to optical radiation sensor 115. Radiation in regions B passes through the apertures in radiation opaque layer 135 and is sensed by sensing elements 120,125.

Figure 2:
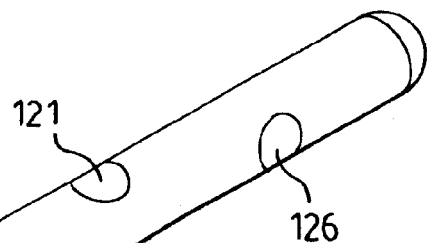
FIGS. 2–6 each illustrate a schematic perspective view of alternate embodiments of the present radiation source assembly.

With reference to FIG. 2, there is shown a perspective view of a schematic alternative to the arrangement showing FIG. 1. Thus, in the embodiment showing FIG. 2, apertures 121 and 126 corresponding to the apertures in radiation opaque layer 135 in FIG. 1 have been offset with respect to one another thereby allowing radiation to be sensed over a broader portion of the radiation field. The nature of the offset can be varied depending on the number of apertures present. Preferably, the offset is equal to ±10° of a value determined be dividing 360° by the number of apertures (e.g., if there are 2 apertures, the offset between respective apertures is 170°–190°; if there are 3 apertures, the offset between respective apertures is 110°–130°; if there are 4 apertures, the offset between respective apertures is 80°–100°; etc.).

Figure 3:
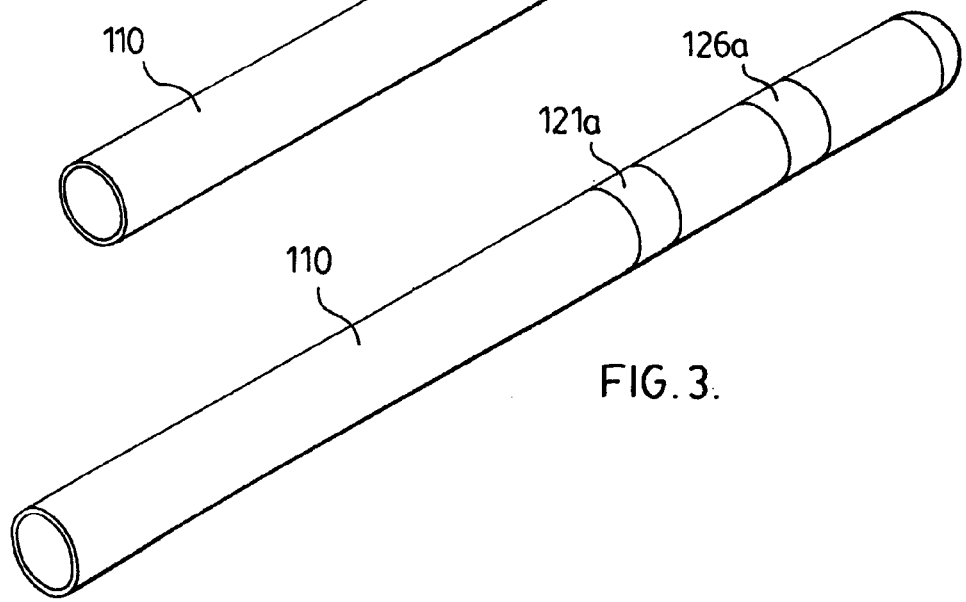

FIG. 3 illustrates yet a further embodiment where protective sleeve 110 has been modified such that the radiation transparent regions are annular portions 121a and 126a.

Figure 4:
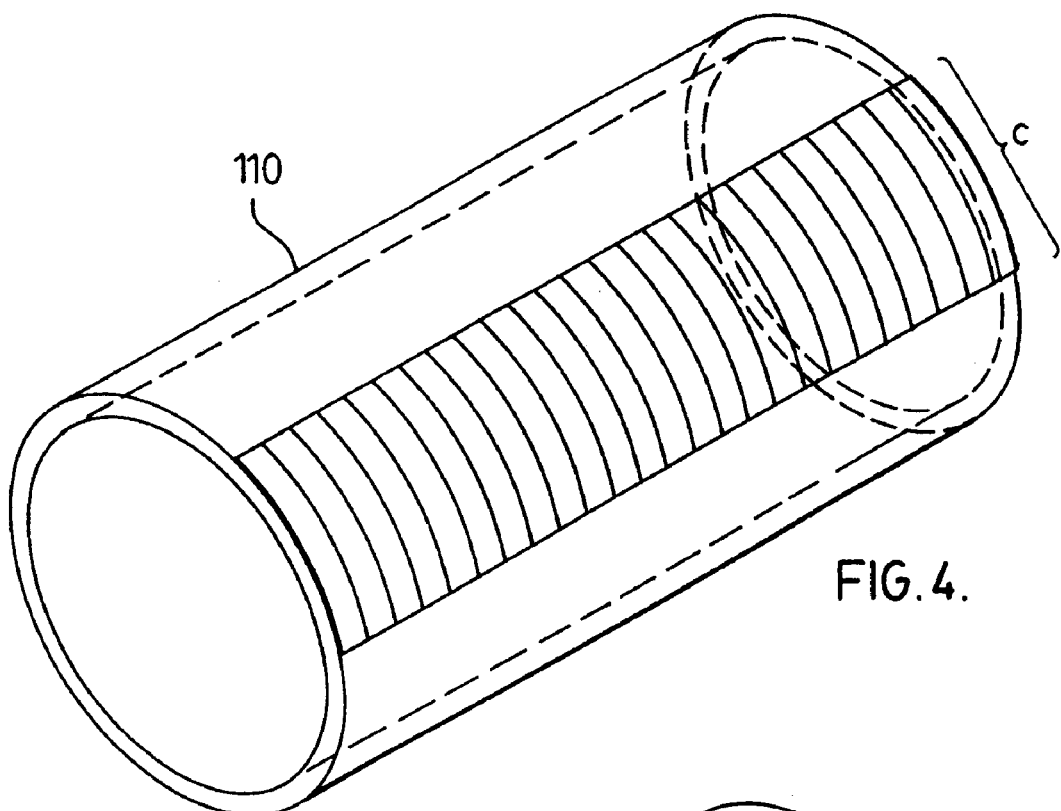

FIG. 4 illustrates yet a further embodiment in which a portion of protective sleeve 110 is shown with a so-called filter layer as described above disposed as a band along at least a portion of protective sleeve 110. This band may be placed on the interior or the exterior of protective sleeve 110.

Figure 5:
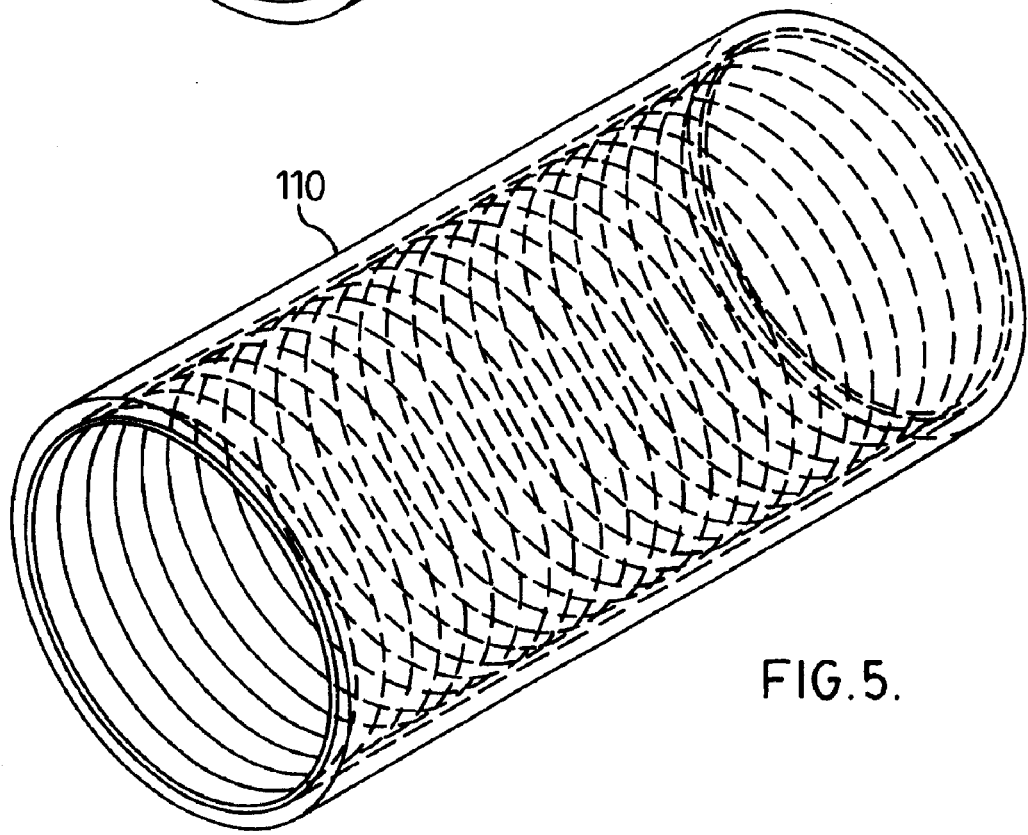

With reference to FIG. 5, there is shown an embodiment of protective sleeve 110 wherein the filter material is disposed all the way around the protective sleeve on the exterior and/or interior thereof. It will be clear that, in this embodiment, there is no region of the protective sleeve where complete radiation opacity is conferred thereto.

Figure 6:
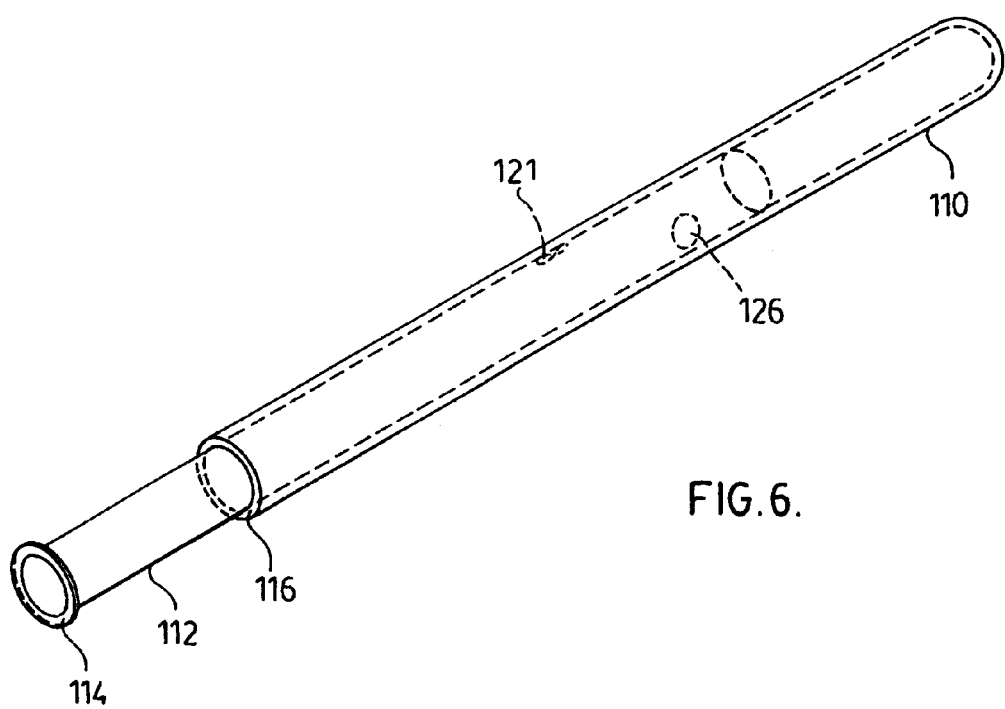

Finally, with reference to FIG. 6, there is shown a preferred embodiment of producing the arrangement shown in FIG. 2. Specifically, an opaque sleeve 112 having apertures 121 and 126 disposed therein may be slid into protective sleeve 110. Opaque sleeve 112 comprises a shoulder 114 which abuts open edge 116 of protective sleeve 110 once opaque sleeve 112 is in the correct position. Opaque sleeve 112 may be made from the materials described above.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A radiation source module for use in fluid treatment system, the module comprising:
   a frame having a first support member;
   at least one radiation source assembly extending from and in engagement with a first support member, the at least one radiation source assembly comprising at least one radiation source disposed within a protective sleeve, the protective sleeve comprising a radiation transparent first region and a radiation opaque second region; and
   an optical radiation sensor disposed within the protective sleeve, the sensor comprising a radiation detector in substantial alignment with the first region and a body portion in substantial alignment with the second region.

2. The radiation source module defined in claim 1, wherein the frame further comprises a second support member opposed to and laterally spaced from the first support member, the at least one radiation source assembly disposed between each of the first support member and the second support member.

3. The radiation source module defined in claim 2, wherein the frame further comprises a third support member interconnecting the first support member and the second support member.

4. The radiation source module defined in claim 1, wherein the frame further comprises a ballast for controlling the at least one radiation source.

5. The radiation source module defined in claim 1, wherein the first support member comprises a hollow passageway for receiving a lead wire for conveying electricity to the at least one radiation source.

6. The radiation source module defined in claim 1, wherein the protective sleeve comprises a quartz sleeve.

7. The radiation source module defined in claim 1, wherein the radiation source module comprises a plurality of radiation source assemblies, at least one radiation source assembly comprising the optical radiation sensor disposed within the protective sleeve.

8. The radiation source module defined in claim 7, wherein the radiation source module comprises at least one radiation source assembly having no optical radiation sensor.

9. The radiation source module defined in claim 1, wherein the radiation source assembly comprises a plurality radiation sources.

10. The radiation source module defined in claim 1, wherein the optical radiation sensor is disposed adjacent to one end of the protective sleeve.

11. The radiation source module defined in claim 1, wherein the first region comprises an annular shape.

12. The radiation source module defined in claim 1, wherein the first region comprises a non-annular shape.

13. The radiation source module defined in claim 1, wherein the first region comprises rectilinear shape.

14. The radiation source module defined in claim 1, wherein the first region comprises curvilinear shape.

15. The radiation source module defined in claim 1, wherein the first region comprises a substantially circular shape.

16. The radiation source module defined in claim 1, wherein the protective sleeve comprises a plurality of radiation opaque second regions.

17. The radiation source module defined in claim 16, wherein the plurality of radiation opaque second regions have substantially the same shape.

18. The radiation source module defined in claim 16, wherein the plurality of radiation opaque second regions have a different shape.

19. The radiation source module defined in claim 1, wherein the radiation opaque second region comprises a radiation opaque layer secured with respect to the protection sleeve.

20. The radiation source module defined in claim 19, wherein the radiation opaque layer is disposed on an inner surface of the protective sleeve.

21. The radiation source module defined in claim 19, wherein the radiation opaque layer is disposed on an outer surface of the protective sleeve.

22. The radiation source module defined in claim 19, wherein the radiation opaque layer is adhered to the protective sleeve.

23. The radiation source module defined in claim 19, wherein the radiation opaque layer is mechanically secured to the protective sleeve.

24. The radiation source module defined in claim 19, wherein the radiation opaque layer is friction fit to the protective sleeve.

25. The radiation source module defined in claim 19, wherein the radiation opaque layer comprises a metallic layer.

26. The radiation source module defined in claim 25, wherein the metallic layer comprises at least one member selected from the group comprising stainless steel, titanium, aluminum, gold, nickel, silver, platinum, nitinol and mixtures thereof.

27. The radiation source module defined in claim 19, wherein the radiation opaque layer comprises a ceramic layer.

28. The radiation source module defined in claim 19, wherein the radiation opaque layer comprises a porous metal structure in combination with a non-metal material.

29. The radiation source module defined in claim 25, wherein the porous metal structure comprises at least one member selected from the group comprising stainless steel, titanium, aluminum, gold, nickel, silver, platinum, nitinol and mixtures thereof.

30. The radiation source module defined in claim 28, wherein the non-metal material comprises an elastomer secured to the porous metal structure.

31. A radiation source assembly for use in a radiation source module, the radiation source assembly comprising a protective sleeve, the protective sleeve comprising a radiation transparent first region and a radiation opaque second region, at least one radiation source disposed in the protective sleeve and an optical radiation sensor disposed in the protective sleeve, the sensor comprising a radiation detector in substantial alignment with the first region and a body portion in substantial alignment with the second region.

32. The radiation source assembly defined in claim 31, wherein the protective sleeve comprises a quartz sleeve.

33. The radiation source assembly defined in claim 31, wherein the radiation source module comprises a plurality of radiation source assemblies, at least one radiation source assembly comprising the optical radiation sensor disposed within the protective sleeve.

34. The radiation source assembly defined in claim 33, wherein the radiation source module comprises at least one radiation source assembly having no optical radiation sensor.

35. The radiation source assembly defined in claim 31, wherein the radiation source assembly comprises a plurality of radiation sources.

36. The radiation source assembly defined in claim 31, wherein the optical radiation sensor is disposed adjacent one end of the protective sleeve.

37. The radiation source assembly defined in claim 31, wherein the first region comprises an annular shape.

38. The radiation source assembly defined in claim 30, wherein the first region comprises a non-annular shape.

39. The radiation source assembly defined in claim 30, wherein the first region comprises rectilinear shape.

40. The radiation source assembly defined in claim 30, wherein the first region comprises curvilinear shape.

41. The radiation source assembly defined in claim 30, wherein the first region comprises a substantially circular shape.

42. The radiation source assembly defined in claim 30, wherein the protective sleeve comprises a plurality of radiation opaque second regions.

43. The radiation source assembly defined in claim 42, wherein the plurality of radiation opaque second regions have substantially the same shape.

44. The radiation source assembly defined in claim 42, wherein the plurality of radiation opaque second regions have a different shape.

45. The radiation source assembly defined in claim 31, wherein the radiation opaque second region comprises a radiation opaque layer secured with respect to the protective sleeve.

46. The radiation source assembly defined in claim 45, wherein the radiation opaque layer is disposed on an inner surface of the protective sleeve.

47. The radiation source assembly defined in claim 45, wherein the radiation opaque layer is disposed on an outer surface of the protective sleeve.

48. The radiation source assembly defined in claim 45, wherein the radiation opaque layer is adhered to the protective sleeve.

49. The radiation source assembly defined in claim 45, wherein the radiation opaque layer is mechanically secured to the protective sleeve.

50. The radiation source assembly defined in claim 45, wherein the radiation opaque layer is friction fit to the protective sleeve.

51. The radiation source assembly defined in claim 45, wherein the radiation opaque layer comprises a metallic layer.

52. The radiation source assembly defined in claim 51, wherein the metallic layer comprises at least one member selected from the group comprising stainless steel, titanium, aluminum, gold, silver, nickel, platinum, nitinol and mixtures thereof.

53. The radiation source assembly defined in claim 45, wherein the radiation opaque layer comprises a ceramic layer.

54. The radiation source assembly defined in claim 45, wherein the radiation opaque layer comprises a porous metal structure in combination with a non-metal material.

55. The radiation source assembly defined in claim 54, wherein the porous metal structure comprises at least one member selected from the group comprising stainless steel, titanium, aluminum, gold, silver, nickel, platinum, nitinol and mixtures thereof.

56. The radiation source assembly defined in claim 54, wherein the non-metal material comprises an elastomer secured to the porous metal structure.

57. A radiation sensor assembly comprising a protective sleeve, the protective sleeve comprising a radiation transparent first region and a radiation opaque second region, an optical radiation sensor disposed in the protective sleeve, the sensor comprising a radiation detector in substantial alignment with the first region and a body portion in substantial alignment with the second region.

58. The radiation sensor assembly defined in claim 57, wherein the protective sleeve comprises a quartz sleeve.

59. The radiation sensor assembly defined in claim 57, wherein the optical radiation sensor is disposed adjacent one end of the protective sleeve.

60. The radiation sensor assembly defined in claim 57, wherein the first region comprises an annular shape.

61. The radiation sensor assembly defined in claim 57, wherein the first region comprises a non-annular shape.

62. The radiation sensor assembly defined in claim 57, wherein the first region comprises rectilinear shape.

63. The radiation sensor assembly defined in claim 57, wherein the first region comprises curvilinear shape.

64. The radiation sensor assembly defined in claim 57, wherein the first region comprises a substantially circular shape.

65. The radiation sensor assembly defined in claim 57, wherein the protective sleeve comprises a plurality of radiation opaque second regions.

66. The radiation sensor assembly defined in claim 65, wherein the plurality of radiation opaque second regions have substantially the same shape.

67. The radiation sensor assembly defined in claim 65, wherein the plurality of radiation opaque second regions have a different shape.

68. The radiation sensor assembly defined in claim 57, wherein the radiation opaque second region comprises a radiation opaque layer secured with respect to the protection sleeve.

69. The radiation sensor assembly defined in claim 68, wherein the radiation opaque layer is disposed on an inner surface of the protective sleeve.

70. The radiation sensor assembly defined in claim 68, wherein the radiation opaque layer is disposed on an outer surface of the protective sleeve.

71. The radiation sensor assembly defined in claim 68, wherein the radiation opaque layer is adhered to the protective sleeve.

72. The radiation sensor assembly defined in claim 68, wherein the radiation opaque layer is mechanically secured to the protective sleeve.

73. The radiation sensor assembly defined in claim 68, wherein the radiation opaque layer is friction fit to the protective sleeve.

74. The radiation sensor assembly defined in claim 68, wherein the radiation opaque layer comprises a metallic layer.

75. The radiation sensor assembly defined in claim 74, wherein the metallic layer comprises at least one member selected from the group comprising stainless steel, titanium, aluminum, gold, silver, nickel, platinum, nitinol and mixtures thereof.

76. The radiation sensor assembly defined in claim 68, wherein the radiation opaque layer comprises a ceramic layer.

77. The radiation sensor assembly defined in claim 68, wherein the radiation opaque layer comprises a porous metal structure in combination with a non-metal material.

78. The radiation sensor assembly defined in claim 77, wherein the porous metal structure comprises at least one member selected from the group comprising stainless steel, titanium, aluminum, gold, silver, nickel, platinum, nitinol and mixtures thereof.

79. The radiation sensor assembly defined in claim 77, wherein the non-metal material comprises an elastomer secured to the porous metal structure.

80. A fluid treatment system comprising:
a fluid treatment zone;
at least one radiation source assembly defined in claim 31 disposed in the fluid treatment zone.

81. The fluid treatment system defined in claim 80, wherein the fluid treatment zone comprises a housing through which fluid flows.

82. The fluid treatment system defined in claim 81, wherein the at least one radiation source assembly is secured to the housing.

* * * * *